UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

936,321.  Specification of Letters Patent.  Patented Oct. 12, 1909.

No Drawing.  Application filed April 29, 1909.  Serial No. 492,967.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in Azo Dye, of which the following is a specification.

Our invention relates to the manufacture and production of new coloring matters capable of dyeing on a mordant.

The new dyestuffs are obtained by combining the diazo compounds of 4-nitro-2-aminophenol compounds of the formula:

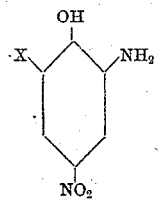

(X standing for halogen or $NO_2$) with para-chlorophenols of the formula:

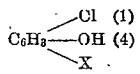

(X standing for hydrogen or methyl).

The new products possess the valuable property that they can be dyed on wool together with bichromate in the same bath. They can also be dyed on a chrome mordant or according to the after-chroming method. The dyeing in one bath is best done by adding the dye with the bichromate to the bath, entering the wool, boiling, adding acetic acid in small portions and boiling again. Brown shades are thus obtained which are distinguished by their fastness to light.

The new dyestuffs are dark powders soluble in water generally with a brown color, and soluble in concentrated sulfuric acid generally with a red color. They yield upon reduction with stannous chlorid and hydrochloric acid 2.4-diaminophenol derivatives and 2-amino-4-chlorophenols of the formula:

(X standing for H or $CH_3$).

In carrying out our new process practically we can proceed as follows, the parts being by weight: 200 parts of picramic acid (2-amino-4.6-dinitrophenol) are dissolved in 160 parts of hydrochloric acid and are diazotized in the usual manner by means of 7 parts of sodium nitrite. The diazo compound is then added to an aqueous solution, which has to be stirred, until the combination is finished, of 156.5 parts of para-chlorophenol (sodium salt) containing 200 parts of sodium carbonate. The dyestuff is precipitated by the addition of common salt, filtered off, pressed and dried. It is a dark brown powder which is soluble in water with a reddish-brown color and which is soluble in concentrated sulfuric acid with a red color. By reduction with stannous chlorid and hydrochloric acid 2.4.6-triaminophenol and 2-amino-4-chlorophenol are obtained. It dyes wool according to the above described method yellowish-brown shades fast to light.

The process is carried out in an analogous manner on starting from chlorocresols e. g. ($CH_3:OH:Cl=1:2:5$) or ($CH_3:OH:Cl=1:3:6$). Instead of picramic acid 6-chloro-4-nitro-2-aminophenol may be used.

We claim:

1. The herein described new azo dyestuffs, obtainable from ortho-aminophenol derivatives, having the above given formula, and para-chlorophenols of the above given formula which dyestuffs are, after being dried and pulverized, dark powders soluble in water generally with a brown color, soluble in concentrated sulfuric acid generally with a red color; yielding upon reduction with stannous chlorid and hydrochloric acid 2.4- diaminophenol derivatives and 2-amino-4-chlorophenols of the above given formula; and dyeing wool together with bichromate and acid in the same bath brown shades, substantially as described.

2. The herein described new azo dyestuff obtainable from picramic acid and para-chlorophenol, which dyestuff is, after being dried and pulverized, a dark brown powder soluble in water with a reddish-brown color, and soluble in concentrated sulfuric acid with a red color; yielding upon reduction with stannous chlorid and hydrochloric acid 2.4.6-triaminophenol and 2-amino-4-chloro-1-phenol; and dyeing wool together with bichromate and acid in the same bath yellowish-brown shades fast to light, substantially as described.

In testimony whereof we have hereunto set our hands in the presence of two subscribing witnesses.

JOHANNES JANSEN. [L. S.]
WILHELM NEELMEIER. [L. S.]

Witnesses:
OTTO KÖNIG,
C. J. WRIGHT.